US006933636B2

(12) United States Patent
Miya et al.

(10) Patent No.: US 6,933,636 B2
(45) Date of Patent: Aug. 23, 2005

(54) RESOLVER I/O TERMINAL STRUCTURE AND METHOD OF CONNECTING RESOLVER THEREBY

(75) Inventors: Taiichi Miya, Tokyo (JP); Kujirai Hiroyuki, Tokyo (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 10/671,983

(22) Filed: Sep. 25, 2003

(65) Prior Publication Data

US 2004/0119350 A1 Jun. 24, 2004

(30) Foreign Application Priority Data

Sep. 25, 2002 (JP) ........................................ 2002-279578

(51) Int. Cl.⁷ ................................................ H20K 7/00
(52) U.S. Cl. ............................ 310/71; 310/42; 310/254
(58) Field of Search ............................. 310/71, 42, 254

(56) References Cited

U.S. PATENT DOCUMENTS

| | | | |
|---|---|---|---|
| 2,922,932 A | | 1/1960 | Glowacki et al. |
| 4,318,022 A | | 3/1982 | Miller |
| 4,419,559 A | * | 12/1983 | Izume ........................ 219/110 |
| 4,964,210 A | | 10/1990 | Takagi |
| 5,606,208 A | | 2/1997 | Sakashita |
| 5,920,135 A | * | 7/1999 | Ohshita ........................ 310/71 |
| 6,031,307 A | * | 2/2000 | Ohshita ........................ 310/71 |
| 6,124,655 A | | 9/2000 | Jeske |
| 6,724,109 B2 | * | 4/2004 | Mimura ........................ 310/71 |
| 2002/0043882 A1 | | 4/2002 | Tanaka et al. |

FOREIGN PATENT DOCUMENTS

| | | |
|---|---|---|
| EP | 0 875 980 A | 11/1998 |
| EP | 1 211 782 A | 6/2002 |
| JP | 10 309067 | 11/1998 |
| JP | 2001 56237 | 2/2001 |
| JP | 2001 330472 | 11/2001 |

OTHER PUBLICATIONS

Patent Abstract of Japnaese Patent No. 05 146106 A in the name of Matsushita Seiko Co. Ltd.
European Search Report for European Patent Application Serial No. 03 02 1770, mailed Feb. 5, 2004.

* cited by examiner

*Primary Examiner*—Burton S. Mullins
*Assistant Examiner*—Iraj A. Mohandesi
(74) *Attorney, Agent, or Firm*—Joel Lutzker; Anna Vishev; Schulte Roth & Zabel (57) ABSTRACT

A terminal for a resolver that operates in a high temperature environment is presented. The terminal includes a terminal block having a through groove. The through groove provides a resistive welder with access to flat terminals mounted on the terminal block. Resistive welding the stator coil wire of the resolver to the flat terminals is less complicated than soldering the stator coil wire to the flat terminals and provides a connection more able to withstand high temperatures.

6 Claims, 7 Drawing Sheets

RESOLVER I/O TERMINAL STRUCTURE AND METHOD OF CONNECTING RESOLVER THEREBY

CROSS-REFERENCE TO RELATED APPLICATIONS

This application claims the benefit of Japanese Patent Application No. 2002-279578 entitled "Resolver I/O Terminal Structure and Method of Connecting Resolver Thereby," naming the same inventors, filed on Sep. 25, 2002, claiming priority benefits under 35 USC § 119.

FIELD OF THE INVENTION

The present invention relates to resolvers. More particularly, the present invention relates to terminals on resolvers that may be used at high temperatures.

BACKGROUND OF THE INVENTION

Resolvers are electrical devices that are most often used as angle measurement transducers. Various types of resolvers have been developed in order to reduce their size and increase their performance.

One type of resolver includes insulating members. To connect to the resolver, pins are included in an extension part of an insulating member. The wires of the stator coil of the resolver connect to the pins, as do the lead wires or an electrical connector on the resolver. An example of such a resolver is disclosed in Japanese Unexamined Patent Application Publication H 10-309067. Making the resolver smaller reduces the amount of insulating material. But because the extension part with the pins is integrated into the insulating member a smaller amount of insulating material renders the extension part more susceptible to breakage when making an electrical connection to the resolver.

Other types of resolvers include connectors with male or female connector pins that are integrated with an insulating cover of the resolver. An example of such a resolver is disclosed in Japanese Unexamined Patent Application Publication 2001-330472. The integration of the pins with the insulating cover makes the connectors mechanically stronger. As such, external connectors may be attached and removed from the resolver with ease. The wires of the stator coils connect to the pins. But because the pins are integrated with insulating cover, reducing the size of such resolvers is difficult.

Yet other types of resolvers have terminal holders within notched parts on the outer periphery of a ring-shaped stator. An example of such a resolver is disclosed in Japanese Unexamined Patent Application Publication 2001-56237. The lead lines to the resolver are along the axial direction of the stator. For these types of resolver, the various corners on the resolver are flat, resulting in a thinner structure with a smaller diameter.

Figure 8:
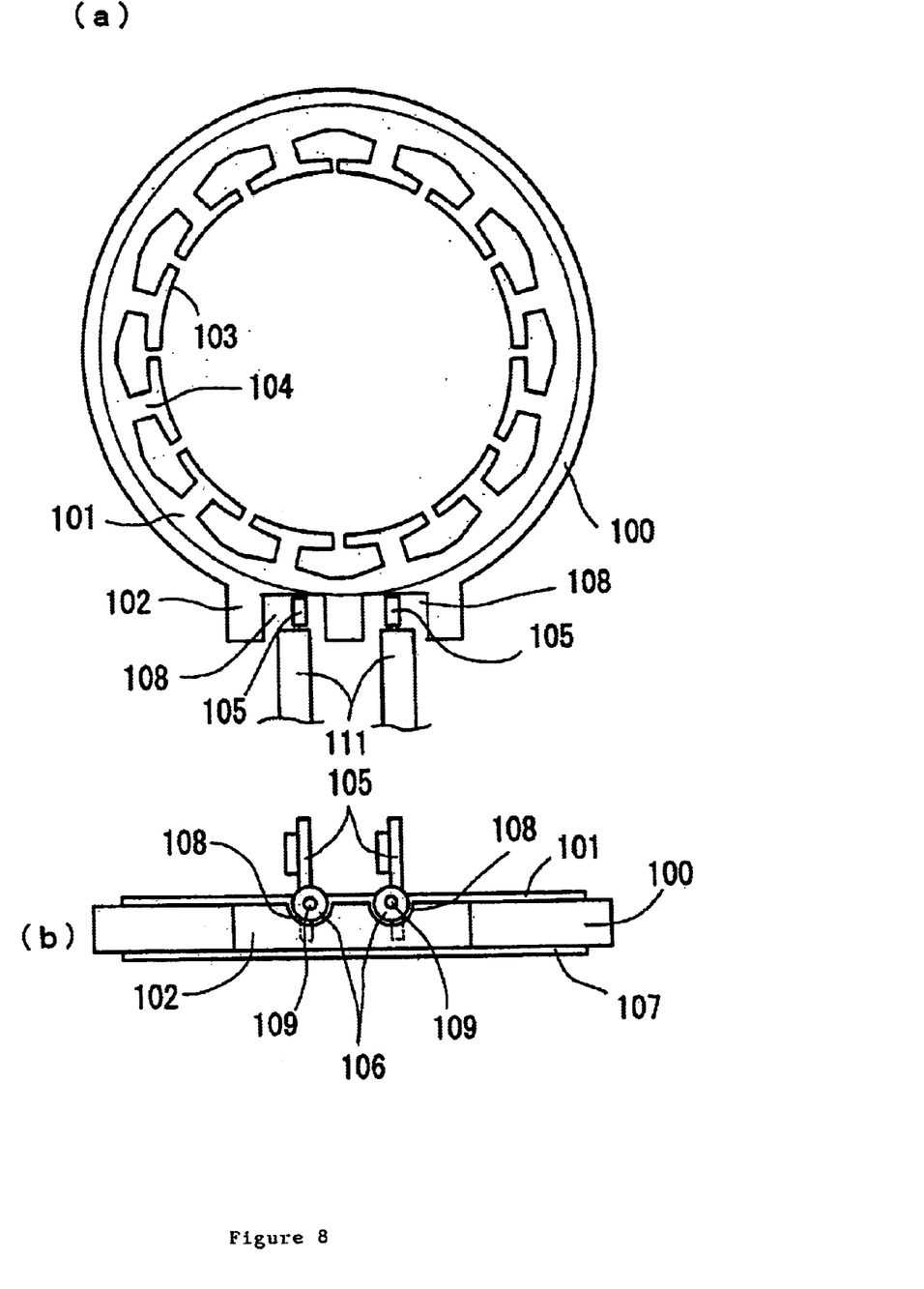
FIG. 8 is a diagram illustrating an example of a high temperature resolver.

Further, all the above-described resolvers operated at normal temperatures and could not withstand high temperatures. An example of a high temperature resolver is shown in FIG. 8. The stator of the resolver includes a stator core 100 comprising multiple layers of plates. Stator magnetic poles 104 protrude from the stator core 100 towards the center of the yoke of the resolver and have multiple stator magnetic pole teeth 103. The wires of the stator coils (not shown) wrap around the stator magnetic poles 104. Two insulating members 101, 107 are on either side of the stator core 100. The periphery of the stator core 100 includes protrusion parts 102, which in turn include grooves 108 to hold the lead wires 111. The grooves 108 also include terminal plates 105.

Figure 9:
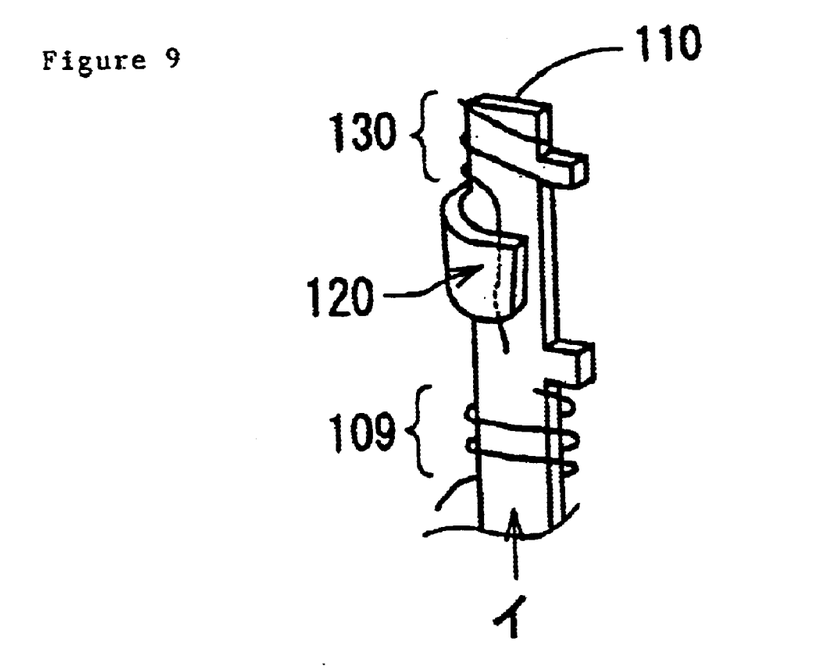
FIG. 9 is a diagram illustrating a terminal plate.

FIG. 9 is a diagram illustrating a terminal plate 105. The bottom part of the terminal plate 105 is rooted in the groove 108 and has a rim-shaped weld part 120 at the top of the terminal plate 105. The weld part 120 is bent and has an end of stator coil wire 130 attached to it by resistance welding or high-temperature soldering. The stator coil wire 130 is also wrapped around the top part of the terminal plate 105.

Figure 10:
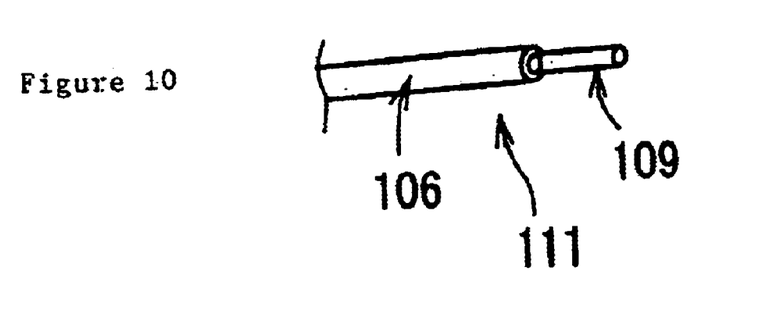
FIG. 10 is a diagram illustrating a lead wire.

FIG. 10 is a diagram illustrating a lead wire 111. The lead wire 111 has a core 109 and a covering 106. Some of the core 109 may be exposed at the tip of the lead wire 111 by means of a mechanical or chemical process. Returning to FIG. 9, the core 109 is wrapped under the weld part 120 of the terminal plate 105.

The resolver of FIG. 8, however, is hard to miniaturize and manufacture through automation. For operation at high temperature, the insulation on the stator coil wires 130 is highly durable, for example polyamideimide insulation. The connections require resistive welding or high-temperature soldering but the weld part 120 must be large enough to accommodate the electrode of the resistive welder. Also, as the terminal plates 105 are in the grooves 108 during welding or soldering, it is difficult to reduce the size of terminal plates 105.

Additional problem with miniaturizing the resolver of FIG. 8 include the removal of insulation on the stator coil wires 130 in order to perform high-temperature soldering. The mechanical or chemical method for removing the insulation may affect the reliability of the resolver. Also, the automatic winding equipment for winding the stator coil wires 130 on such a resolver may be complicated.

SUMMARY

A terminal for a resolver is described below to address the need for a sturdy connector for resolvers that operate at high-temperatures. One aspect of the invention is a terminal that includes a terminal block having a top side and a bottom side. The terminal block has a lengthwise open through groove between the top side and the bottom side. The terminal also includes at least one flat terminal disposed widthwise on the bottom side of the terminal block and traversing the through groove. Each flat terminal of the at least one flat terminal has a top side adjacent the through groove and a bottom side comprising a weld part for retaining stator coil wire of the resolver. In this manner the stator coil wire may be welded to the flat terminal by contacting a first electrode of a resistive welder to the top side of the flat terminal via the through groove and contacting a second electrode of the resistive welder to the weld part.

Another aspect of the invention is a terminal that includes a terminal block and means for connecting a stator coil wire to the terminal by welding. The means for connecting the stator coil wire is attached to the terminal block. The terminal also includes means for connecting a lead line to the terminal. The means for connecting the lead line is attached to the terminal block and is in electrical communication with the means for connecting the stator coil wire.

Yet another aspect of the invention is a resolver that includes the combination of a stator core, at least one stator coil, a terminal block, and at least one flat terminal. The at least one stator coil includes stator coil wires wound on the stator core. The terminal block has a top side and a bottom side and a lengthwise open through groove between the top side and the bottom side. The at least one flat terminal is disposed widthwise on the bottom side of the terminal block and traverses the through groove. Each flat terminal of the at least one flat terminal has a top side adjacent the through groove and a bottom side comprising a weld part for retaining the stator coil wire. In this manner the stator coil wire is welded to the flat terminal by contacting a first electrode of a resistive welder to the top side of the flat terminal via the through groove and contacting a second electrode of the resistive welder to the weld part.

The foregoing and other features and advantages of preferred embodiments will be more readily apparent from the following detailed description, which proceeds with reference to the accompanying drawings.

DETAILED DESCRIPTION OF THE PREFERRED EMBODIMENTS

Figure 1:
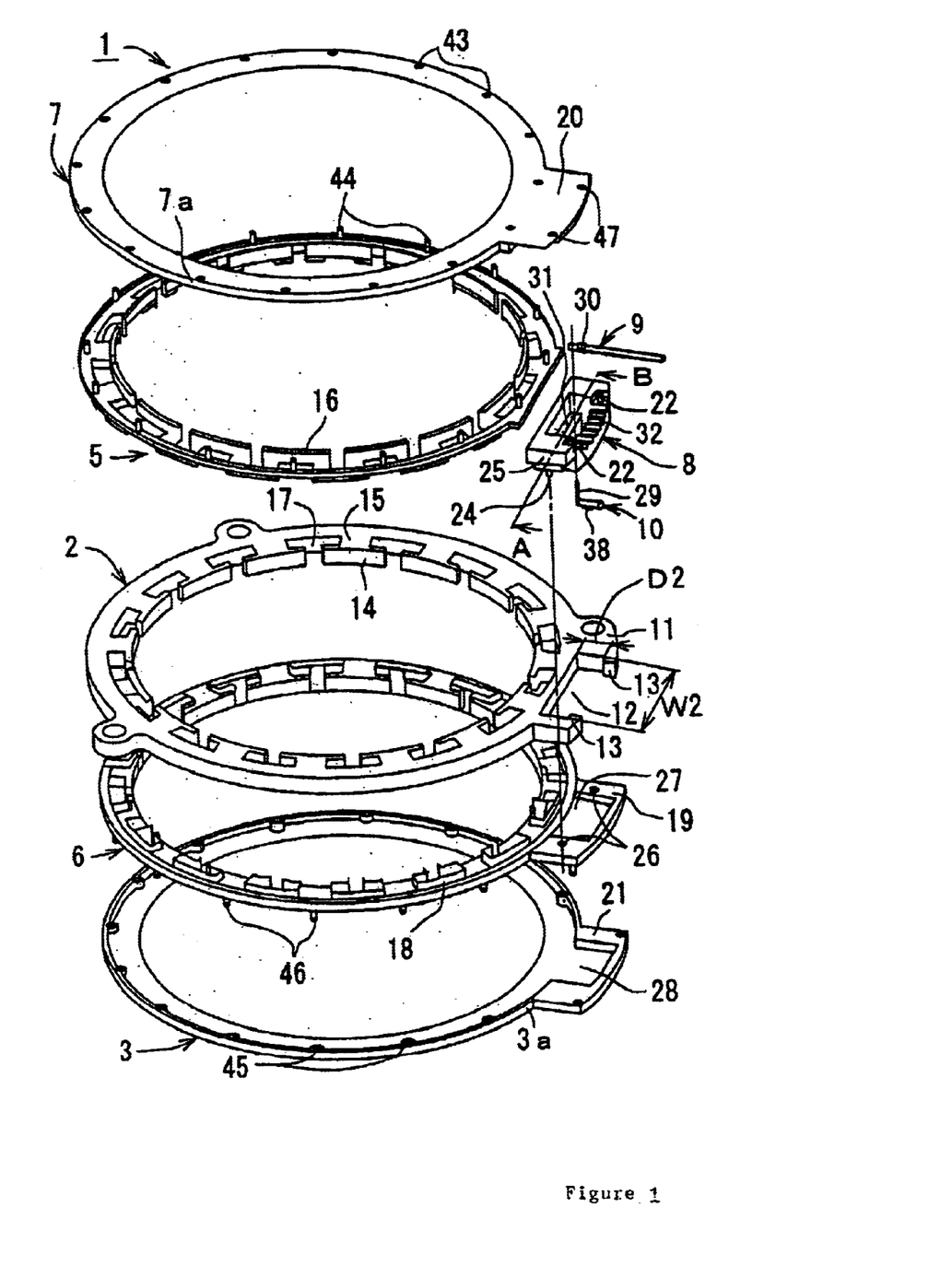
FIG. 1 is a diagram showing a preferred embodiment of a stator assembly of a resolver.

FIG. 1 is a diagram showing a preferred embodiment of a stator assembly 1 of a resolver. The stator assembly has a stator core 2 comprising multiple stacked plates with stator magnetic poles 15. The stator magnetic poles 15 have multiple stator magnet pole teeth 14 directed towards a yoke part (not shown) of the resolver. Stator coil wires (not shown) wind around the stator magnetic poles 15 and may be insulated by a material that can withstand high temperatures, such as polyamideimide.

On either axial side of the stator core 2 are insulating members 5, 6 which in turn have covers 3, 7 on their outsides. The insulating members 5, 6 have rim parts 16, 18, which match the stator magnetic pole teeth 14. The insulating members 5, 6 also have protrusions 44, 46, which respectively fit into holes 43, 45 in the covers 3, 7. The insulating members 5, 6 and covers 3, 7 may be made of a polymer, such as polybutylene teraphtlalate.

The stator assembly 1 also includes a terminal block 8 that mates with indentations 12 in a protrusion 11 of the stator core 2. The tips 13 of the protrusions are deformable to align with the outer periphery of the stator assembly 1 when terminal block 8 is mated with the protrusion 11. The lower insulating member 6 has a protrusion 19. The terminal block 8 fits into a notched part 27 of the protrusion 19. The lower insulating member 6 also has through holes 26. Also, the lower cover 3 has a protrusion 21 with an indentation 28 that accepts the terminal block 8.

The terminal block 8 includes a protrusion part 24 and a rim part 25. The protrusion part 24 mates with the protrusion part 19 of the lower insulating member 6 by means of the through holes 26. Similarly, the rim part 25 mates with the upper insulating member 5 and contacts the protrusion part 11 of the stator core 2. The terminal block 8 also includes fastening protrusions 22 on either side that fit into holes 47 on the upper cover 7. The terminal block may be made of a material that is a strong insulator and can withstand high temperatures, such as Teflon®. Alternatively, the structure of the protrusion part 19 of the lower insulating member 6 may be fabricated on the upper insulating member 5. Likewise, the structures on the upper 7 and lower 3 covers may be interchanged, with a similar inversion of the rim 25 and protrusion 24 part of the terminal block 8.

During assembly, the terminal block 8 fits into the indentation part 12 of the stator core 2. The mating parts 16, 18 of the lower 6 and upper 5 insulating members are inserted into the coil wire part 17 of the stator core 2. The rim part 16 aligns with the magnetic pole teeth 14. The protrusion parts 44 of the upper insulating member 5 fit into the holes 43 of the upper cover 7, and the protrusion pats 46 of the lower insulating member 6 fit into the holes 45 of the lower cover 3.

Figure 2:
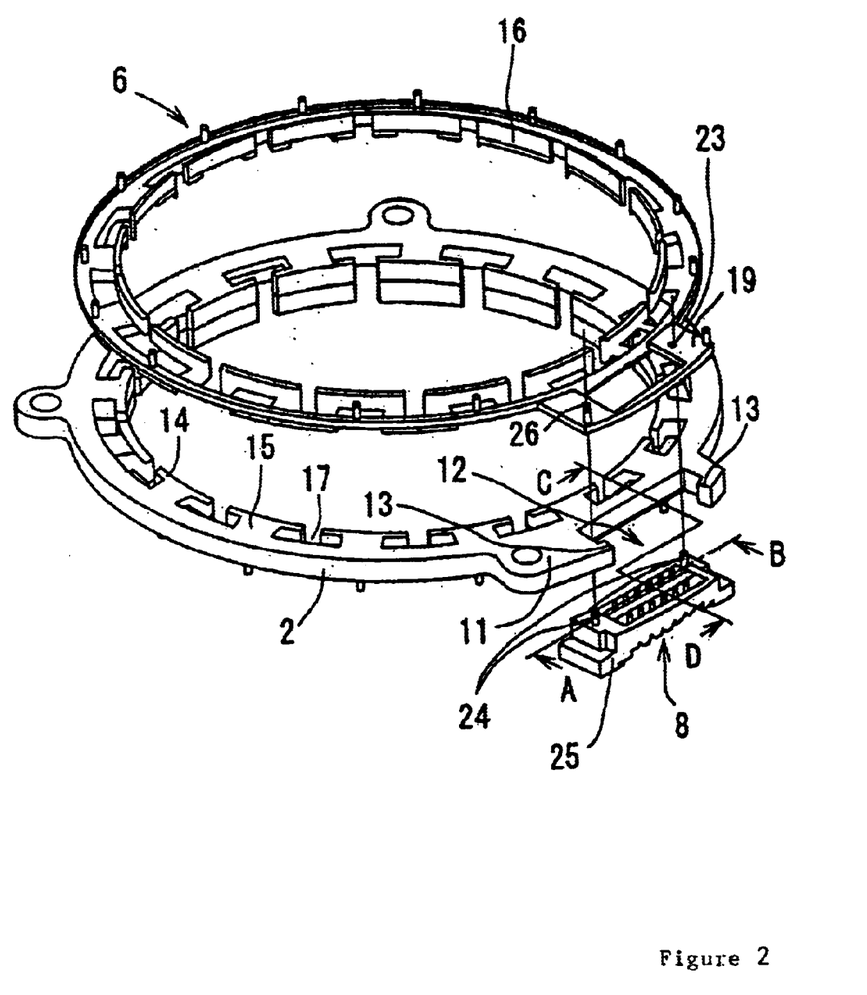
FIG. 2 is an underside view of the stator assembly 1 of FIG. 1.

FIG. 2 is an underside view of the stator assembly 1 of FIG. 1. FIG. 2 shows the bottom insulating member 6, the stator core 2, and the terminal block 8. When assembled, the rim part 25 of the terminal block 8 makes contact with the upper insulating member 5 and is held in place by the tips 13 of the protrusion part 11 of the stator core 2. The protrusion parts 24 of the terminal block 8 fit through the holes 26 on the lower insulating member 6.

Figure 3:
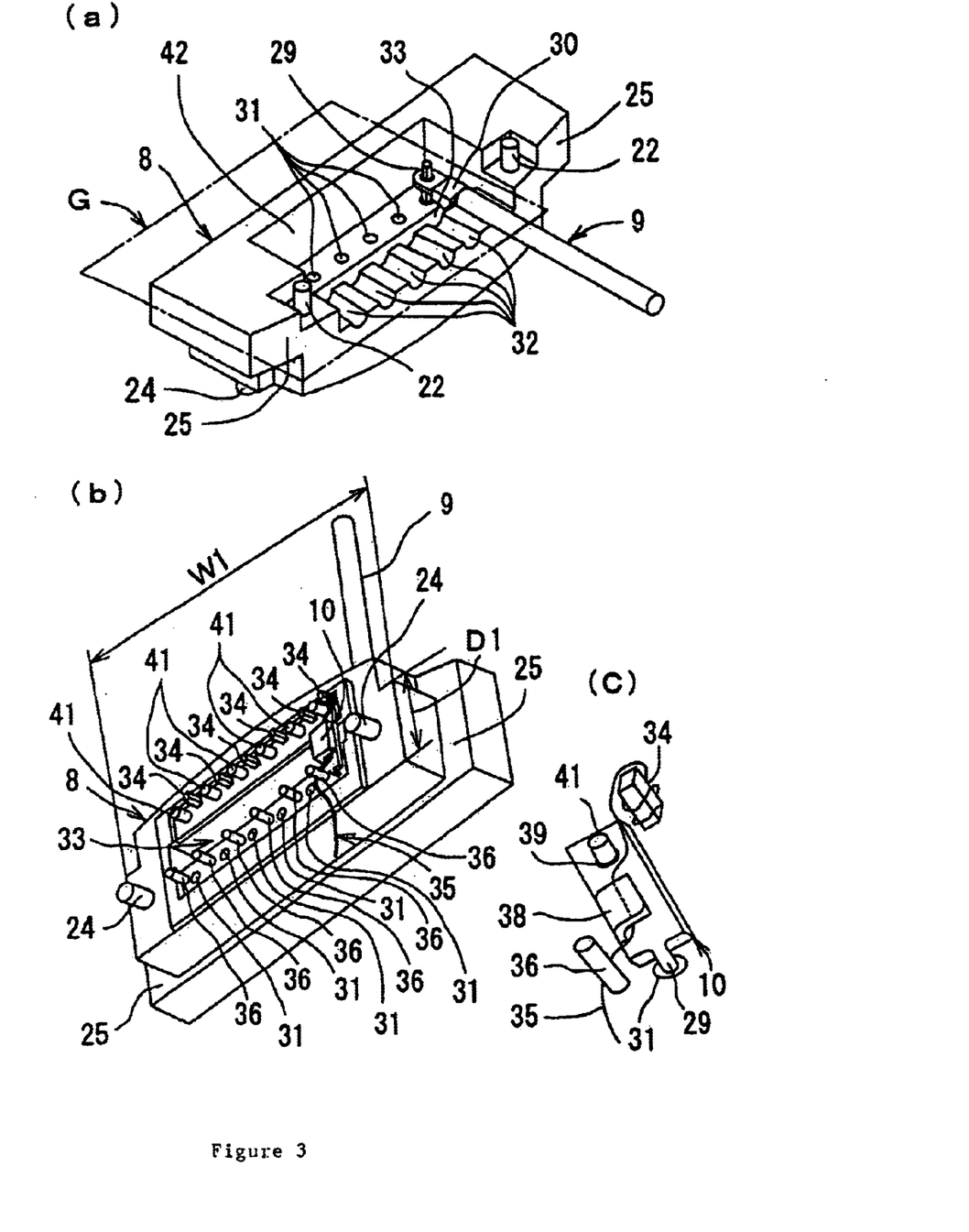
FIG. 3 are views of the structure of the terminal blocks of FIG. 1.

FIG. 3 are views of the structure of the terminal blocks 8 of FIG. 1. The top surface of the terminal block 8 includes an indentation having multiple fastening grooves 32, through holes 31, and a through groove 33. The indentation also includes protrusion parts 22, which are higher than the top surface of the terminal block 8 and fit into holes 47 on the upper cover 7 to secure the terminal block to the upper cover 7 upon assembly. The through groove 33 is between through holes 31 and fastening grooves 32, and extends to the bottom of the terminal block 8. The through holes 31 are aligned with the fastening grooves 32 on either side of the through groove 33.

Multiple pin parts 29 of flat terminals 10 pass through the through holes 31. The lead lines 9 have connection terminals 30 at their ends. The connection terminals 30 are welded to the pin parts 29 to connect the lead lines 9 to the stator assembly 1. The lead lines 9 sit in the fastening grooves 32.

The bottom surface of the terminal block 8 also has an indentation as shown in FIG. 3. The width W1 and depth D1 of the bottom surface are approximately the same as the width W2 and depth D2 of the indentation part 12 of the stator core 2 as shown in FIG. 1. The indentation includes the through groove 33 from the top surface of the terminal block 8 and two rows of structures either side of the through groove 33. One row of structures includes alternating fastening pins 34 and anchor posts 41. The other row includes the through holes 31 from the top surface of the terminal block 8 alternating with slack pins 36. The bottom surface of the terminal block 8 also includes the protrusion parts 24 that fit through the holes 26 on the lower insulating member 6 and are parallel to the slack pins 36.

Flat terminals 10 traverse the through groove 33. The top sides of the flat terminals 10 are adjacent the through groove 33. Each flat terminal has a hole 39 that accepts an anchor post 41 on the indentation of the bottom surface of the terminal block 8. Each flat terminal also has a weld part 38 on the bottom side of the flat terminal 10 and a pin part 29. The pin parts 29 pass through the though holes 31 from the bottom surface of the terminal block 8 to emerge from the top surface.

Stator coil wire is connected to the terminal block 8 by running the tip 35 of the stator coil wire past the slack pin 36, through the weld part 36, and around the fastening pin 34. The tip 35 is wrapped around the fastening pin 34, which preferably has an essentially rectangular core section to secure the stator coil wire and is at an angle to the flat terminal 10. The slack pins 36 preferably have notches near their bases 20 so as to facilitate bending. The stator coil wire that passes through the gaps of the weld parts 38 are subject to resistive welding.

Figure 4:
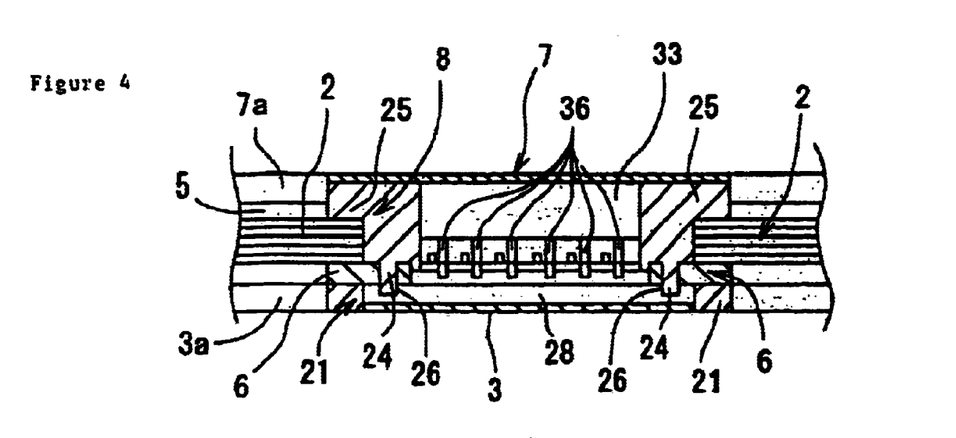
FIG. 4 is a diagram showing a cross section of a part of the stator assembly of FIG. 1.
Figure 5:
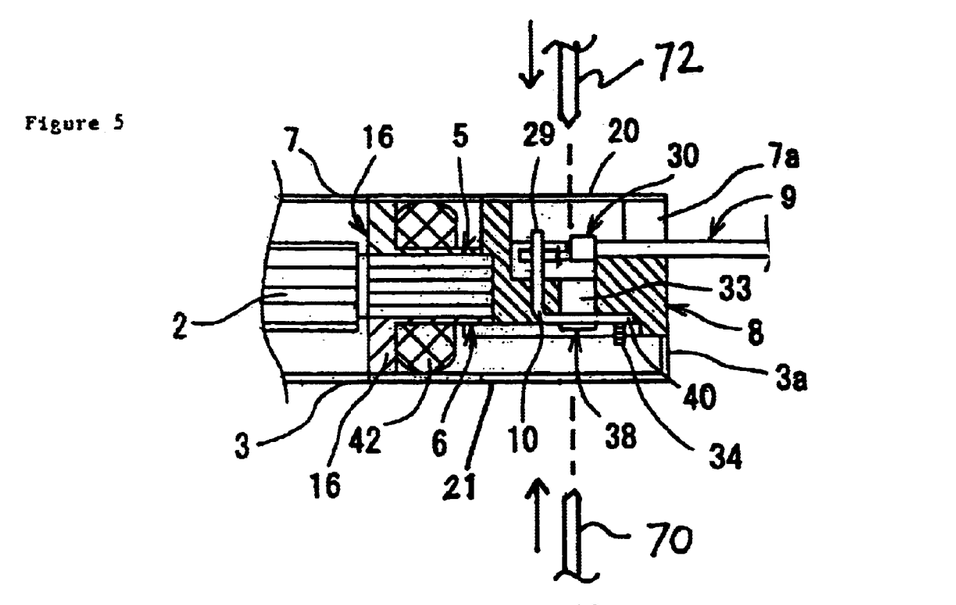
FIG. 5 is a diagram showing another cross section of a part of the stator assembly of FIG. 1.

FIG. 4 and FIG. 5 are diagrams showing cross sections of a part of the stator assembly 1 of FIG. 1. The terminal block 8 fits in the indentation part 12 of the stator core 2 where the rim part 25 of the terminal block 8 is in contact with the protrusion part 11 of the stator core 2. The top insulating member 5 is in contact with the protrusion part 20 of the top cover 7 and the surrounding standing wall 7a of the top cover 7. The protrusion parts 24 of the terminal block 8 fit through the holes 26 in the lower insulating member 6. The lower insulating member 6 is in contact with the lower cover 3 and its surrounding standing wall 3a.

Figure 6:
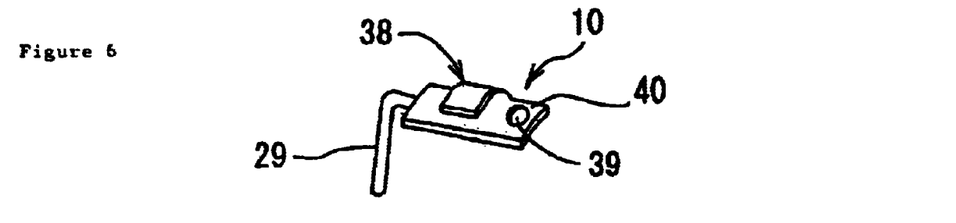
FIG. 6 is a diagram of a flat terminal.

FIG. 6 is a diagram of a flat terminal 10. The flat terminals 10 may be composed of a material which may be composed of a material that may be resistively welded or arc welded, such as phosphor copper. The flat terminal 10 has a pin part 29 that is bent at approximately 90 degrees to the terminal part 40 of the flat terminal 10. The terminal part 40 has a hole 39, opposite the pin part 29, that accepts the anchor posts 41 of the terminal block 8. The weld part 38 is on the face of the flat terminal 10 that is opposite the direction of the pin part 29. The weld part 38 defines a space with respect to the terminal part 40 through which the tip 35 of a stator coil wire passes. The tip 35 is resistively welded to the weld part 38.

Figure 7:
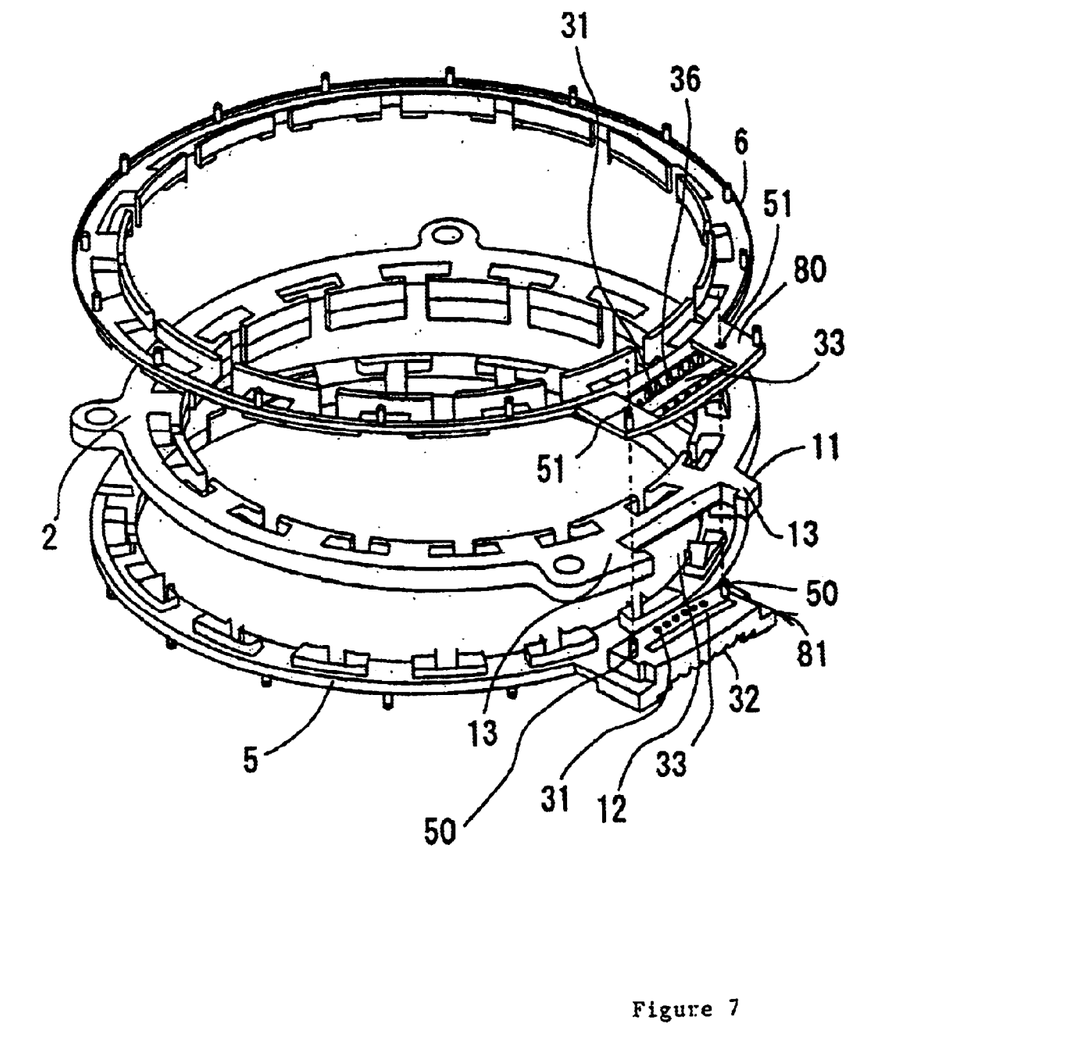
FIG. 7 is a diagram illustrating another preferred embodiment of the stator assembly of FIG. 1.

FIG. 7 is a diagram illustrating another preferred embodiment of the stator assembly 1 of FIG. 1. In FIG. 7, the terminal block 8 is divided into two parts along the plane G of FIG. 3, i.e. the part above plane G is in the protrusion 81 of the upper insulating member 5, and the part below plane G is in the protrusion 80 of the lower insulating member 6. The protrusion 81 is on the periphery of the upper insulating member 5 and includes the through holes 31 and the through groove 33. Also, the protrusion 81 includes the grooves 32 for the lead lines 9. Protrusion parts 50 on to terminal block 8 are on either side of the through groove 33 where the protrusion 81 contacts the stator core 2.

The lower insulating member 6 has a protrusion 80 on its outer periphery. The protrusion 80 has an indentation sunk into the side opposite to the stator core. The indentation includes multiple through holes 31 and the through groove 33. On one side of the through groove 33 are anchor posts 41, and on the other side of the through groove 33 are slack pins 36 alternating with the through holes 31. This may be also seen from FIG. 3b as described above. The slack pins 36 may include notches engraved at their bases 20, which may be bent from the base of the terminal block 8. Protrusion 80 includes through holes 51 on both ends of the through groove 33. The indentation 12 of the protrusion 11 of the stator core 2 have protrusions 50, which fit into through holes 51 whereupon the tips are welded in order to secure the upper insulating member 5 and the lower insulating member 6 to the stator core 2.

The stator assembly 1 of FIG. 1 may be assembled in the following manner. Flat terminal pin parts 29 are inserted into the multiple through holes 31 in the terminal block 8. The anchor posts 41 mate with the through holes 39 of the flat terminals 10. The terminal block 8 is mated with the indentation 12 on the protruding part 11 of the stator core 2. The lower insulating member 6 and the upper insulating member 5 fit tightly on either side of the stator core 2, and the protrusion parts 24 mate with the through holes 26 at the tips. The tips of the mating protrusion parts 24 are welded to fasten the lower insulating member 5 and the upper insulating member 6 to the stator core 2.

With reference to FIGS. 3 and 5, the stator core coil wires (not shown) wrap around the respective magnetic poles of the stator assembly unit 1. The tips 35 of the stator coil wires are wrapped onto the tips of fastening pins 34 after passing between the weld parts 38 and across the slack pins 36. The weld parts 38 of the flat terminals 10 are bent to secure the tips 35 of the stator coil wires.

The two electrodes 70, 72 of a resistive welder may respectively contact the weld part 38 and top side of each flat terminal 10 to bend the weld part 38 onto the bottom side of the flat terminal 10 and retain the tip 35 of the stator coil wire. The electrode 72 that contacts the top side of the flat terminal 10 does so by passing through the through groove 33 from the top side of the terminal block 8. Thereafter, the stator coil wire is resistively welded to the flat terminal 10. In this manner, the tips 35 of the stator coil wires pass through the weld parts 38 for attachment to the flat terminals 10. The slack pins 36 thereafter are bent to secure the tips 35 of the stator coil wire to the terminal block 8.

The tips of the connector terminals 30 are press fitted onto the lead lines 9. The lead lines 9 sit in the lead line fastening grooves 32. The connector terminals 30 mate with the ends of the flat terminal pin parts 29 passing through the terminal block 8 via the through holes 31. The flat terminal pin parts 29 and connection terminals 30 are arc welded together. In this manner the lead lines 9 connect to the tips 35 of the stator coil wires. The bending of the slack pins 36 may be performed after completing the above-mentioned arc welding.

With reference to FIG. 7 the stator assembly 1 may be assembled as follows. The flat terminals 10 are mounted on the terminal block 8 by inserting the flat terminal pin parts 29 into the through holes 31 on the upper insulating member 5. Additionally, the anchor posts 41 of the terminal block 8 accept the through holes 39 of the flat terminals 10. The flat terminals 10 traverse the through groove 33 as is shown in FIG. 3b. Protrusion 81 of the upper insulating member 5 and protrusion 80 of the lower insulating member 6 fit tightly to either side of the indentation 12 of the stator core 2. The protrusion parts 50 and through holes 51 are mated and the tips of the protrusion parts 50 are welded, thereby securing the upper insulating member 5 and the lower insulating member 6 to the stator core 2.

Although the invention described herein is with reference to particular embodiments, it should be understood that these embodiments are merely illustrative of the principals and application of the present invention. It should therefore be understood that modifications may be made to the exemplary embodiments described herein, and that other arrangements may be devised without departing from the spirit and scope of the present invention as defined by the following claims.

What is claimed is:

1. A terminal for a resolver comprising:
   a terminal block having a top side and a bottom side, wherein the terminal block has a lengthwise open through groove between the top side and the bottom side, and wherein the terminal block comprises at least one through hole between the top side of the terminal block and the bottom side of the terminal block; and at least one flat terminal disposed widthwise on the bottom side of the terminal block and traversing the through groove, wherein each flat terminal of the at least one flat terminal has a top side adjacent the through groove and a bottom side comprising a weld part for retaining stator coil wire of the resolver, whereby the stator coil wire is welded to the flat terminal by contacting a first electrode of a resistive welder to the top side of the flat terminal via the through groove and contacting a second electrode of the resistive welder to the weld part, and wherein the flat terminal further comprises a pin part that passes through a respective through hole of the terminal block from the bottom side of the terminal block to the top side of the terminal block.

2. The terminal of claim 1, wherein the pin part comprises an end that exits the through hole on the top side of the terminal block, whereby a lead line of the resolver connects to the end of the pin part.

3. The terminal block of claim 1 further comprising at least one anchor post on the bottom side of the terminal block, wherein the flat terminal further comprises a hole from the bottom side of the flat terminal to the top side of the flat terminal, and wherein a respective anchor post of the at least one anchor post passes through the hole.

4. The terminal of claim 1 further comprising at least one fastening pin on the bottom side of the terminal block, wherein the flat terminal is adjacent a respective fastening pin, whereby the stator coil wire wraps around the fastening pin.

5. The terminal of claim 1 further comprising at least one slack pin on the bottom side of the terminal block, wherein the flat terminal is adjacent a respective slack pin, whereby the slack pin is bent to secure the stator coil wire to the terminal block.

6. The terminal of claim 5, wherein the slack pin includes a notch, whereby the slack pin is bent at the notch to secure the stator coil wire to the terminal block.

* * * * *